(12) United States Patent
Schneider et al.

(10) Patent No.: US 12,442,237 B2
(45) Date of Patent: Oct. 14, 2025

(54) DOOR SAFETY SYSTEM, METHOD FOR OPERATING A DOOR SAFETY SYSTEM, AND TRANSPORT MEANS

(71) Applicant: Rosenberger Hochfrequenztechnik GmbH & Co. KG, Fridolfing (DE)

(72) Inventors: Levente Schneider, Fridolfing (DE); Herbert Kozel, Freilassing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 771 days.

(21) Appl. No.: 17/769,926

(22) PCT Filed: Oct. 15, 2020

(86) PCT No.: PCT/EP2020/079041
§ 371 (c)(1),
(2) Date: Apr. 18, 2022

(87) PCT Pub. No.: WO2021/074293
PCT Pub. Date: Apr. 22, 2021

(65) Prior Publication Data
US 2022/0356744 A1  Nov. 10, 2022

(30) Foreign Application Priority Data
Oct. 17, 2019 (DE) ............. 10 2019 128 079.6

(51) Int. Cl.
*E05F 15/43* (2015.01)
*E05F 15/60* (2015.01)

(52) U.S. Cl.
CPC .............. *E05F 15/43* (2015.01); *E05F 15/60* (2015.01); *E05Y 2400/44* (2013.01);
(Continued)

(58) Field of Classification Search
CPC ...... E05F 15/43; E05F 15/60; E05Y 2400/44; E05Y 2400/45; E05Y 2400/54;
(Continued)

(56) References Cited

U.S. PATENT DOCUMENTS 5,836,639 A   11/1998  Kleefeldt
10,259,453 B2 *  4/2019  Fletcher ................ B60W 10/18
(Continued)

FOREIGN PATENT DOCUMENTS

CN       110191997 A1    8/2019
DE       20001473 01     5/2000
(Continued)

OTHER PUBLICATIONS

German Search Report dated Nov. 27, 2022.
(Continued)

*Primary Examiner* — Aryan E Weisenfeld
(74) *Attorney, Agent, or Firm* — Randall Danskin P.S.

(57) ABSTRACT

A door safety system (3) for a door (2), having a safety component (10) arranged on a movable door element (4, 4*a*, 4*b*) of the door (2) and a supply component (11) arranged on a stationary door frame (5) of the door (2) for supplying energy to the safety component (10). The safety component (10) has an electric energy store (12) which is designed to autonomously supply electric energy to the safety component (10) when the door (2) is open, and the safety component (10) and the supply component (11) are designed to electrically charge the electric energy store (12) of the safety component (10) when the door (2) is closed.

21 Claims, 2 Drawing Sheets

Figure 1:
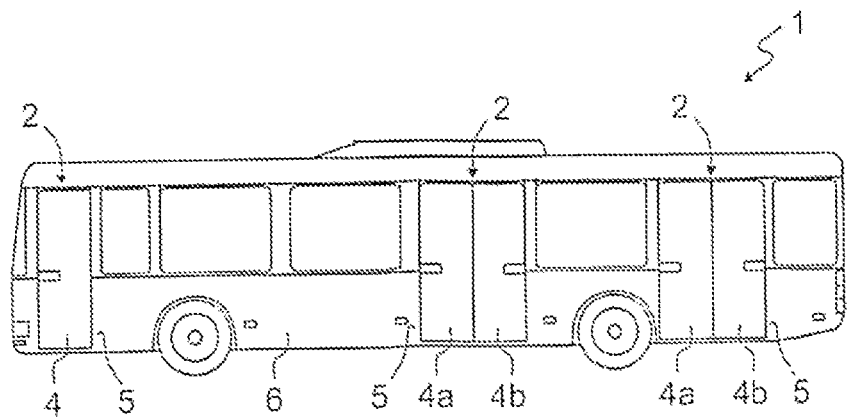

(52) U.S. Cl.
CPC ....... *E05Y 2400/45* (2013.01); *E05Y 2400/54* (2013.01); *E05Y 2400/614* (2013.01); *E05Y 2400/664* (2013.01); *E05Y 2600/46* (2013.01); *E05Y 2900/104* (2013.01); *E05Y 2900/502* (2013.01); *E05Y 2900/506* (2013.01); *E05Y 2900/51* (2013.01)

(58) Field of Classification Search
CPC ......... E05Y 2400/614; E05Y 2400/664; E05Y 2600/46; E05Y 2900/104; E05Y 2900/502; E05Y 2900/506; E05Y 2900/51
See application file for complete search history.

(56) References Cited

U.S. PATENT DOCUMENTS

| | | |
|---|---|---|
| 10,358,858 B2 | 7/2019 | Lietz |
| 2005/0073852 A1 | 4/2005 | Ward |
| 2015/0188345 A1 | 7/2015 | Sohn |

FOREIGN PATENT DOCUMENTS

| | | | |
|---|---|---|---|
| DE | 20001473 | U1 | 5/2000 |
| DE | 102016012037 | A1 | 4/2018 |
| EP | 0908594 | | 4/1999 |
| EP | 3530856 | A1 | 8/2019 |
| FR | 2708029 | | 1/1995 |
| WO | 0908594 | * | 10/1998 |
| WO | 2011138292 | A1 | 11/2011 |
| WO | 2018219694 | A1 | 12/2018 |

OTHER PUBLICATIONS

International Search Report dated Jan. 25, 2021.
Office Action issued by the Chinese Patent Office dated Jan. 12, 2024.
Office Action issued by the European Patent Office Action dated May 20, 2022.

* cited by examiner

DOOR SAFETY SYSTEM, METHOD FOR OPERATING A DOOR SAFETY SYSTEM, AND TRANSPORT MEANS

CROSS-REFERENCE TO RELATED APPLICATION

This US National Stage Non-Provisional Patent Application claims priority to earlier filed PCT Patent Application No. PCT/EP2020/079041 which was filed on 15 Oct. 2020 and was published as WO 2021/074293 A1 on 22 Apr. 2021, and further claims priority to still earlier filed German Patent Application No. 10 2019 128 079.6 which was filed on 17 Oct. 2019. The entire contents of the aforementioned earlier filed PCT Patent Application and the earlier filed German Patent Application are both expressly and fully incorporated herein by this reference.

Pursuant to USPTO rules, this priority claim to earlier file PCT Patent Application No. PCT/EP20201079041 which was filed on 15 Oct. 2020 and which was published as WO 2021/074293 A1 on 22 Apr. 2021, and to still earlier filed German Patent Application No. 10 2019 128 079.6 which was filed on 17 Oct. 2019 is also included in the Application Data Sheet (ADS) filed herewith.

FIELD OF INVENTION

The invention relates to a door safety system for a door, having a safety component and a supply component for supplying the safety component with electricity.

The invention further relates to a door, in particular an automatic door of a transport means. The invention also relates to a transport means, in particular an omnibus or a rail vehicle.

The invention also relates to a method for operating a door safety system of a door.

The invention furthermore also relates to a computer program product and to a use of a door safety system.

BACKGROUND OF THE INVENTION

Automatic doors, for example single-leaf or double-leaf pivot-and-slide doors, are known in particular from public transport.

In order to make it safer to enter a transport means equipped with automatic doors and to avoid injuries to persons or damage to objects in the closing region of the door leaves, the doors have a safety component. Various safety systems which are generally arranged on the movable door elements, for example the door leaves, are known.

In particular, light barriers and so-called safety contact strips can ensure that no objects are jammed between the closing door elements or between a door element and the door frame. If the light barrier or the safety contact strip detects an object at risk of collision, the closing operation of the door can be aborted and the door may also be partially or completely opened again, if necessary. Light strips and acoustic signal generators for alerting persons to upcoming closing of the door are also known.

WO 2018/219694 A1, for example, which relates to a profiled safety strip for at least one door of transport means and also explains further technical background, can provide a good overview of the known prior art.

For the purpose of supplying electricity and interchanging data with the safety components arranged on the movable door elements, cable harnesses are laid in practice in the region of the hinges or pivot arms. Since the cable harnesses are exposed to constant mechanical loading by virtue of the frequent opening and closing of the door, the individual lines of the cable harnesses and the plug connectors involved are accordingly susceptible to damage and age in a disproportionately fast manner.

In addition, the cable harnesses generally cannot be covered sufficiently well and can therefore be shielded from external influences only to a limited extent. The cable harnesses are therefore susceptible, inter alia, to malicious or unintentional damage by passengers.

The known door safety systems are therefore overall susceptible to interference, expensive and can be maintenance-intensive.

In view of the known prior art, an object of the present invention is to provide an improved door safety system which can be used, in particular, in a robust and low-maintenance manner.

The present invention is also based on the object of providing a door having an improved door safety system which can be used, in particular, in a robust and low-maintenance manner.

In addition, an object of the invention is to provide a transport means having at least one improved door having a door safety system which can be used, in particular, in a robust and low-maintenance manner.

An object of the invention is also to provide an advantageous method for operating a door safety system which can be used, in particular, in a robust and low-maintenance manner.

Furthermore, an object of the invention is to provide a computer program product for an advantageous method for operating a door safety system and an advantageous use of a door safety system.

For the door safety system, and with respect to the door, and, with respect to the transport means, and with respect to the method and with respect to, the computer program product, and, with regard to the use, the objects are achieved with the features disclosed herein, including those disclosed in the Claims.

A door safety system for a door is provided. The door safety system has a safety component arranged on a movable door element of the door. The door safety system also has a supply component which is arranged on an immovable door frame of the door and is intended to supply the safety component with electricity.

The terms "movable" and "immovable" relate in this case to the movement of the door element relative to the door frame or the stationary framework of the door element. The door element is therefore movable relative to the door frame, wherein the door frame is arranged immovably on a surrounding structure, for example on a vehicle body, on an elevator shaft or on a wall.

The invention provides for the safety component to have an electrical energy store which is designed to autonomously supply the safety component with electrical energy in the open state of the door. The safety component and the supply component are designed to electrically charge the electrical energy store of the safety component in the closed state of the door.

The supply component therefore preferably supplies the safety component with electrical energy only in the closed state of the door.

The supply component can supply the safety component to the effect that the electrical energy store of the safety component is supplied with electrical energy for charging. Optionally, the supply component can also directly supply the safety component with electrical energy in the closed state of the door, while the energy store is also possibly charged at the same time.

A "closed state" of the door means, in particular, a completely closed state of the door. An "open state" may therefore preferably be a state of the door in which the door is no longer completely closed, that is to say also an intermediate state between a completely closed door and a completely open door. The energy store may therefore autonomously supply the safety component even during the opening operation of the door.

As a result of the fact that the supply component supplies the safety component with electricity only in the closed state of the door and the safety component can otherwise be operated autonomously by its energy store, it is possible to dispense with a cable harness between the movable door element and the door frame for the purpose of supplying energy to the electronics of the door element.

Dispensing with the supply lines means that the entire door safety system is ultimately less susceptible to faults and can be operated in a low-maintenance manner. The service life and safety of a door safety system according to the invention are therefore increased.

Provision may be made for the supply component to charge the energy store of the safety component each time the door is closed, until the door is opened again. However, provision may also be made for the supply component to always charge the energy store only after a defined number of closing operations, for example only after every second operation of closing the door, after every third operation of closing the door, after every fourth operation of closing the door etc. This makes it possible to reduce the charging cycles of the energy store and therefore to possibly increase the service life of the energy store.

Provision may also be made for the supply component to charge the energy store of the safety component only after manual release by a user, for example a driver of a vehicle. A charging operation can therefore also be provided only during relatively long operating pauses, for example. A schedule-dependent charging plan may also be provided, according to which a charging operation is provided only between certain stops, for example.

Provision may also be made for the supply component to charge the energy store of the safety component only to a defined state of charge, for example to a state of charge of 30% to 80% of the total capacity of the energy store, preferably to a state of charge of 50% to 80% of the total capacity of the energy store, particularly preferably to a state of charge of 70% to 80% of the total capacity of the energy store. The charging operation can therefore be interrupted even if the closing duration of the door would allow further charging. This also makes it possible to possibly further increase the service life of the energy store.

One advantageous development of the invention may provide for the safety component to be designed to protect living beings (in particular animals and people) or objects.

In principle, however, the safety component may also be an electronic door lock (for example an electronic door lock with biometric access control, RFID access control or a code lock). However, the safety component is preferably not a door lock.

One development of the invention may provide for the safety component to have a light barrier for detecting living beings or objects in the closing region of the door. Alternatively or additionally, provision may be made for the safety component to have a safety contact strip for detecting a collision of the door element with a living being or an object.

Alternatively or additionally, provision may be made for the safety component to have an optical, acoustic or haptic signal generator for warning living beings, in particular in order to indicate a door which is closing soon or a door which is already closing.

The light barrier may be, in particular, the form of a light grid. A light grid for contactless anti-trap protection is preferably provided, for example the LEXI light grid from Gummi-Welz GmbH & CO. KG. If an object is detected between a door element and the door frame or between two door elements, an interruption signal for stopping the closing operation of the door can be generated. Such systems are sufficiently well known, in particular, for omnibuses and rail vehicles, which is why the functional principle is not discussed any further in the present case.

The safety contact strip may be, in particular, in the form of a rubber profiled strip between a door element and the door frame or between two door elements, in which one or more electrical contacts are integrated and can generate an electrical interruption signal for stopping the closing operation of the door in the event of collision-related compression of the rubber profile. Such safety contact strips are also known under the term profiled safety strip for omnibuses and rail vehicles (cf., for example, WO 2018/219694 A1).

Signal generators for warning persons of closing doors are also known, in particular, from local public transport. For example, the invention is advantageously suitable for use with a Fedra LED light strip from Gummi-Welz GmbH & CO. KG. The use of buzzers or periodic acoustic signal generators may also be advantageously provided for use with the invention.

The safety component preferably has a plurality of safety systems in combination, for example a light grid, a safety contact strip and a light strip.

One development of the invention may provide for the safety component to be designed to transmit an electrical interruption signal to an actuator device used to move the door element or to initiate transmission of an interruption signal in order to interrupt an automatic closing operation of the door by means of the actuator device.

The actuator device may have, in particular, one or more motors for opening and closing the door element (or a plurality of door elements). The actuator device and the motors are preferably fastened to the door frame or in the region of the door frame and are therefore not arranged on the movable door element.

In particular, the motors of the actuator device may be in the form of electric motors. However, pneumatic motors, hydraulic motors or other motors may also be highly suitable. If reference is made to an electric motor herein below, this should not be understood as being restrictive.

Provision may be made for the actuator device to be designed to abort the closing operation—or possibly also an opening operation—upon receiving the interruption signal, that is to say to stop or partially or completely reverse the movement of the door element (or of the door elements) and to open the door elements again, for example.

The interruption signal may be, and without limitation, an analog and/or digital data signal.

One development of the invention may provide for the electrical energy store of the safety component to be in the form of a rechargeable battery pack with at least one rechargeable battery cell.

Provision is preferably made of a rechargeable battery pack with a plurality of rechargeable battery cells which are connected to one another in a series circuit and/or a parallel circuit in order to provide a current that is sufficiently high to supply the safety component, to provide a sufficiently high voltage and to keep available a suitable supply capacity.

For example, it is possible to provide two or more rechargeable battery cells in a series circuit, three or more rechargeable battery cells in a series circuit, four or more rechargeable battery cells in a series circuit, five or more rechargeable battery cells in a series circuit or even more rechargeable battery cells in a series circuit. For example, it is also possible to provide two or more rechargeable battery cells in a parallel circuit, three or more rechargeable battery cells in a parallel circuit, four or more rechargeable battery cells in a parallel circuit, five or more rechargeable battery cells in a parallel circuit or even more rechargeable battery cells in a parallel circuit.

The actual number of rechargeable battery cells and the interconnection thereof are not necessarily important within the scope of the invention.

Provision may be made for at least one of the rechargeable battery packs that are used to be a lithium ion rechargeable battery pack. In particular when using lithium ion rechargeable battery packs, the rechargeable battery cells of which have a nominal voltage of approximately 3.3 to 3.8 volts (generally a nominal voltage of approximately 3.7 volts), provision may be made for four rechargeable battery cells to be arranged in a series circuit, as a result of which the rechargeable battery pack has a nominal voltage of approximately 14.8 volts.

However, the rechargeable battery pack may also be, and without limitation, a nickel-metal hybrid rechargeable battery, a nickel-cadmium rechargeable battery or a lead rechargeable battery. In principle, the invention should not be understood as being restricted to the use with a particular type of rechargeable battery pack.

In principle, the electrical energy store may have any desired design. It need not necessarily be a rechargeable battery pack. For example, the electrical energy store may also be a store for electrical energy that does not or does not exclusively have an electrochemical structure, that is to say a capacitor or a plurality of capacitors, for example.

One development of the invention may provide for the safety component and the supply component to be designed to electrically charge the electrical energy store of the safety component wirelessly or contactlessly, preferably inductively, in the closed state of the door.

A wireless energy transmission path may be particularly advantageous since the electrical components may be completely encapsulated in this case and may therefore be well protected from environmental influences. In addition, energy can be transmitted even when the components, in particular coils, used to transmit energy are not ideally aligned with one another. Tolerances in the alignment of the closed door elements inside the door frame can therefore be compensated for. However, the distance and/or the lateral offset between the coils during energy transmission is/are preferably not greater than approximately 4 millimeters.

Wireless or contactless energy transmission is preferably carried out by means of planar, open coils using the so-called resonance method.

In order to reduce electromagnetic emitted interference and to ensure suitable electromagnetic compatibility (EMC) of the door safety system, provision may be made for individual components of the door safety system to be electromagnetically shielded, for example using a metal shielding housing, an Mu metal film and/or an absorber foil.

Foreign object detection may optionally be provided at the transmitter end in order to detect foreign objects in the vicinity of the coils and to reduce or abort the transmission of energy, if necessary, if a foreign object has been detected.

One development of the invention may also provide for the safety component and the supply component to be designed to electrically charge the electrical energy store of the safety component of the door by virtue of a contact element arranged on the door element and electrically connected to the safety component making contact with a mating contact element arranged on the door frame and electrically connected to the supply component in the closed state of the door.

In principle, contact-based energy transmission may therefore also be provided, but wireless or contactless energy transmission is preferred.

Any number of contact pairs comprising a contact element and a mating contact element may be provided, in particular one contact pair, two contact pairs, three contact pairs, four contact pairs, five contact pairs, six contact pairs, seven contact pairs, eight contact pairs or even more contact pairs of contact elements and mating contact elements.

The contact element and the mating contact element of a contact pair preferably make contact at their ends.

The contact element and/or the mating contact element of a contact pair may be in the form of a flat contact, for example. Provision may also be made for the contact element to be in the form of a pin contact, for example in the form of a spring contact pin ("Pogo pin"), and for the mating contact element to be in the form of a flat contact, or vice versa. A plug-in contact or a combination of a plug and a socket may also possibly be provided. Furthermore, magnetic contacts may also be provided, for example a magnetic carriage, according to which one or more of the contact elements and/or mating contact elements are raised by means of magnetic forces of attraction in order to establish the electrical contact.

One development of the invention may provide for a control component arranged on the door frame to be provided for the purpose of controlling and/or monitoring the safety component.

The control component may be configured, for example, to actuate a signal generator of the safety component if the door is being closed or is intended to be closed. The control component may also be configured to evaluate sensors of the safety component, for example a light barrier and/or a safety contact strip, in order to possibly trigger an interruption signal for stopping a movement of the door element, in particular closing of the door.

The control component may also be configured to forward an interruption signal from the safety component to the actuator device for the purpose of stopping a movement of the door.

One advantageous development of the invention may provide for the safety component and the control component to be designed to wirelessly interchange electrical data signals with one another.

Wireless data communication between the safety component and the control component is particularly preferred since, in this case, it is generally possible to completely dispense with a cable connection between the door element and the door frame. In principle, however, even a reduction in the lines in the cable harness may be advantageous, which can already be ensured by the autonomous supply of energy to the door element in its open state. Wireless data communication is therefore not absolutely necessary within the scope of the invention, but is particularly preferred.

The safety component and the control component may each have a radio module in order to develop the wireless data communication.

If further safety components are provided, for example on further door elements, each of the safety components may have its own radio module. However, only precisely one control component with precisely one radio module, which communicates with all radio modules of the safety components, is preferably provided for each door or even for each transport means.

One advantageous development of the invention may provide for the safety component and the control component to be designed to wirelessly interchange the data signals using a radio standard, in particular using a radio standard within the ISM band.

Bidirectional data communication is preferably provided between the safety component and the control component. In principle, however, only a unidirectional data connection may also be provided (starting from the safety component or from the control component).

As already mentioned, if a plurality of door elements or safety components are provided, it may already suffice for a common control component to perform the data communication with all safety components.

The radio standard may be, for example, and without limitation, a Bluetooth standard, a ZigBee standard or another radio standard.

A WLAN standard is particularly preferably provided. The radio module of the control component can therefore set up a WLAN network in which the radio modules of the safety component can log on for the purpose of interchanging data. An encrypted and/or invisible WLAN network is preferably provided.

The invention also relates to a door, in particular an automatic door of a transport means. The door has a door frame, at least one movable door element and at least one door safety system. The door safety system is preferably designed as described herein.

One advantageous development of the invention may provide for the transport means to be an omnibus, a rail vehicle, an aircraft, a cable car or an elevator car.

In principle, however, it may be any desired transport means, for example also, and without limitation, a motor vehicle, a commercial vehicle or a spacecraft, but in particular a transport means of local public transport.

However, the invention is also suitable for use with a door of a building.

One development of the invention may provide for the movable door element to be in the form of a door leaf (also referred to as a "door panel").

In principle, however, the door element may be any desired movable element of the door.

One development of the invention may provide for precisely one movable door element to be provided. However, provision may also be made for precisely two movable door elements to be provided, wherein each of the door elements has a corresponding safety component which is supplied with electricity by the supply component of the door frame.

If the door has two door elements, they can preferably be moved toward one another in order to close the door and can be moved away from one another in order to open the door.

In principle, doors having more than two door elements may also be provided.

One advantageous development of the invention may provide for an actuator device to be arranged on the immovable door frame in order to automatically open or close the at least one door element.

The actuator device comprises, in particular, one electric motor for each door element, but it is also possible to provide a common electric motor for all door elements of the door. Instead of an electric motor, however, it is also possible to provide a motor of another type, for example a hydraulic or pneumatic motor.

The actuator device may also have an accordingly suitable mechanical system, in particular special hinges and/or pivot arms, in order to open the door elements.

The door may be, in particular, in the form of a sliding door, a pivot-and-slide door, a plug door, a revolving door, a trapdoor, an interior swing door, an exterior swing door or another door.

The invention also relates to a transport means, in particular an omnibus or a rail vehicle, having at least one door according to the embodiments herein.

In this case, the term "transport means" describes any means of transportation, in particular vehicles on land, on water or in the air, also including spacecraft.

The transport means may have any desired number of doors, for example precisely one door, two or more doors, three or more doors, four or more doors, five or more doors or six or even more doors. If more than one door is provided, different types of doors may also be combined with one another in the transport means, for example doors with only one movable door element and doors with two door elements.

In addition, the invention also relates to a method for operating a door safety system of a door. In this case, provision is made for a safety component arranged on a movable door element of the door to be supplied with electricity by a supply component arranged on an immovable door frame of the door. Provision is also made for the safety component to be autonomously supplied with electrical energy by its own electrical energy store in the open state of the door, which electrical energy store is electrically charged by the supply component in the closed state of the door.

The safety component preferably transmits an electrical interruption signal to an actuator device used to move the door element or causes the transmission of the interruption signal from another location, for example from the control component of the door frame, in order to interrupt an automatic closing operation of the door by means of the actuator device if the safety component detects a collision or an imminent collision of the door element with a living being or an object.

The supply component preferably charges the electrical energy store of the safety component wirelessly, preferably inductively, in the closed state of the door.

A control component arranged on the door frame is preferably used to control and/or monitor the safety component. The control component and the safety component particularly preferably communicate in a wireless manner for this purpose, in particular via a WLAN connection.

The invention also relates to a computer program product having program code means for carrying out the method according to the embodiments herein when the program is executed on a control device of a door safety system (in particular according to the embodiments herein).

The control device may be in the form of a microprocessor. Instead of a microprocessor, it is also possible to provide any desired further device for implementing the control device, for example one or more arrangements of discrete electrical components on a printed circuit board, a programmable logic controller (PLC), an application-specific integrated circuit (ASIC) or another programmable circuit, for example including a field programmable gate array (FPGA), a programmable logic array (PLA) and/or a commercially available computer.

The invention furthermore also relates to a use of a door safety system according to the embodiments herein above-and-below for at least one door of a transport means, in particular an omnibus or a rail vehicle.

The features which have been described in connection with the door safety system can also be advantageously implemented for the door, the transport means, the method, the computer program product and the use, and vice versa. Furthermore, advantages which have already been mentioned in connection with the door safety system can also be understood as being relevant to the door, the transport means, the method, the computer program product and the use, and vice versa.

Terms such as "comprising", "having" or "with" do not exclude any other features or steps. Furthermore, terms such as "a/an" or "the", which refer in the singular to steps or features, do not exclude a plurality of features or steps, and vice versa.

The values and parameters described herein also include deviations or fluctuations of ±10% or less, preferably ±5% less, more preferably ±1% or less, and very particularly preferably ±0.1% or less, of the respectively mentioned value or parameter, provided that these deviations are not excluded when implementing the invention in practice. The indication of ranges using starting and end values also comprises all those values and fractions which are included in the respectively mentioned range, in particular the starting and end values and a respective mean value.

Exemplary embodiments of the invention are described in more detail below on the basis of the Figures.

SUMMARY

Our Door Safety System, Method for Operating a Door Safety System, and Transport Means generally provides a door safety system for a door having a safety component and a supply component that supplying the safety component with electricity.

A principal aspect of the present invention is a door safety system (3) for a deer (2), having a safety component 10) arranged on a movable door element (4, 4a, 4b) of the door (2) and a supply component (11) which is arranged on an immovable door frame (5) of the door (2) and is intended to supply the safety component (10) with electricity, characterized in that the safety component (10) has an electrical energy store (12) which is designed to autonomously supply the safety component (10) with electrical energy in the open state of the door (2), and wherein the safety component (10) and the supply component (1) are designed to electrically charge the electrical energy store (12) of the safety component (10) in the closed state of the door (2).

A further aspect of the present invention is a door safety system (3), characterized in that the safety component (10) is designed to protect living beings or objects.

A further aspect of the present invention is a door safety system (3), characterized in that the safety component (10) has a light barrier (13) for detecting living beings or objects in the closing region of the door (2), a safety contact strip (14) for detecting a collision of the door element (4, 4a, 4b) with a living being or an object and/or an optical, acoustic or haptic signal generator (15) for warning living beings.

A further aspect of the present invention is a door safety system (3), characterized in that the safety component (10) is designed to transmit an electrical interruption signal (16) to an actuator device (7) used to move the door element (4, 4a, 4b) or to initiate transmission of an interruption signal (16) to the actuator device (7) in order to interrupt an automatic closing operation of the door (2) by means of the actuator device (7).

A further aspect of the present invention is a door safety system (3), characterized in that the electrical energy store (12) of the safety component (10) is in the form of a rechargeable battery pack with at least one rechargeable battery cell.

A further aspect of the present invention is a door safety system (3), characterized in that the safety component (10) and the supply component (11) are designed to electrically charge the electrical energy store (12) of the safety component (10) wirelessly, preferably inductively, in the closed state of the door (2).

A further aspect of the present invention is a door safety system (3), characterized in that the safety component (10) and the supply component (1) are designed to electrically charge the electrical energy store (12) of the safety component (10) of the door (2) by virtue of a contact element arranged on the door element (4, 4a, 4b) and electrically connected to the safety component (10) making contact with a mating contact element arranged on the door frame (5) and electrically connected to the supply component (11) in the closed state of the door (2).

A further aspect of the present invention is a door safety system (3), characterized in that a control component (22) arranged on the door frame (5) is provided for the purpose of controlling and/or monitoring the safety component (10).

A further aspect of the present invention is a door safety system (3), characterized in that the safety component (10) and the control component (22) are designed to wirelessly interchange electrical data signals with one another.

A further aspect of the present invention is a door safety system (3), characterized in that the safety component (10) and the control component (22) are designed to wirelessly interchange the data signals using a radio standard, in particular using a radio standard within the ISM band.

A further aspect of the present invention is a door (2), in particular an automatic door (2) of a transport means (1), having a door frame (5), at least one movable door element (4, 4a, 4b) and a door safety system (3) as claimed in one of claims 1 to 10.

A further aspect of the present invention is a door (2), characterized in that the transport means is an omnibus (1), a rail vehicle, an aircraft, a cable car or an elevator car.

A further aspect of the present invention is a door (2), characterized in that the movable door element (4, 4a, 4b) is in the form of a door leaf.

A further aspect of the present invention is a door (2) characterized in that precisely one movable door element (4, 4a, 4b) is provided; or precisely two movable door elements (4, 4a, 4b) are provided, and wherein each of the door elements (4, 4a, 4b) has a corresponding safety component (10) which is supplied with electricity by the supply component (11) of the door frame (5).

A further aspect of the present invention is a door (2), characterized in that an actuator device (7) is arranged on the immovable door frame (5) in order to automatically open or close the at least one door element (4, 4a, 4b).

A further aspect of the present invention is a transport means, in particular an omnibus (1) or a rail vehicle, having at least one door (2).

A further aspect of the present invention is a method for operating a door safety system (3) of a door (2), according to which a safety component (10) arranged on a movable door element (4, 4a, 4b) of the door (2) is supplied with electricity by a supply component (11) arranged on an immovable door frame (5) of the door (2), characterized in that the safety component (10) is autonomously supplied with electrical energy by its own electrical energy store (12) in the open state of the door (2), which electrical energy store is electrically charged by the supply component (11) in the closed state of the door (2).

A still further aspect of the present invention is a computer program product having program code means for carrying out a method as disclosed herein when the program is executed on a control device (23, 28) of a door safety system (3).

An even still further aspect of the present invention is a use of a door safety system (3) for at least one door (2) of a transport means, in particular an omnibus (1) or a rail vehicle.

These and other aspects of the present invention are more fully set forth and disclosed herein.

BRIEF DESCRIPTIONS OF THE FIGURES

The figures each show preferred exemplary embodiments which illustrate individual features of the present invention in combination with one another. Features of an exemplary embodiment can also be implemented separately from the other features of the same exemplary embodiment and can accordingly be readily combined by a person skilled in the art with features of other exemplary embodiments to form further useful combinations and sub-combinations.

In the figures, functionally identical elements are provided with the same reference signs.

FIG. 1 schematically shows an omnibus having a plurality of doors which are equipped with a door safety system according to the invention.

Figure 2:
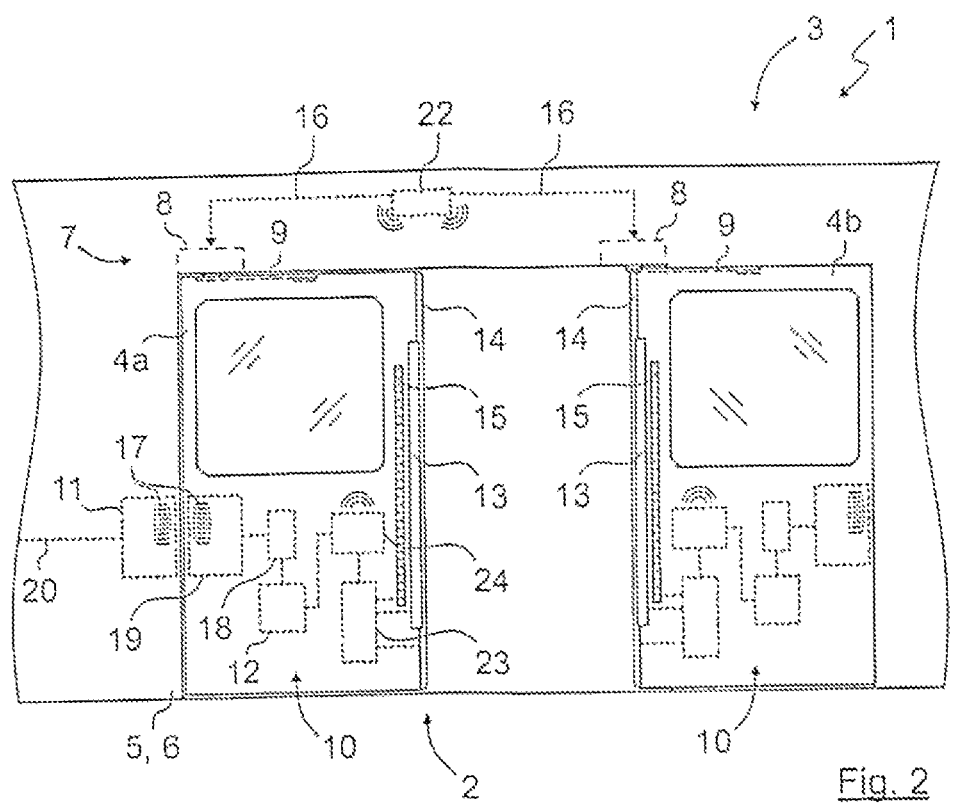

FIG. 2 schematically shows a door having a door frame, two movable door elements and advantageous electronic components of the door safety system.

Figure 3:
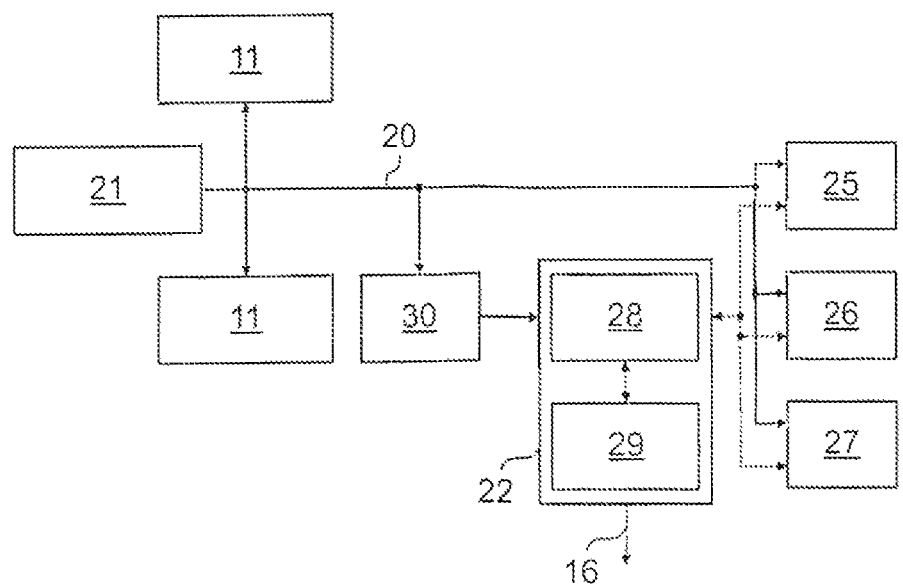

FIG. 3 schematically shows a block diagram of the electronic components of the door frame.

Figure 4:
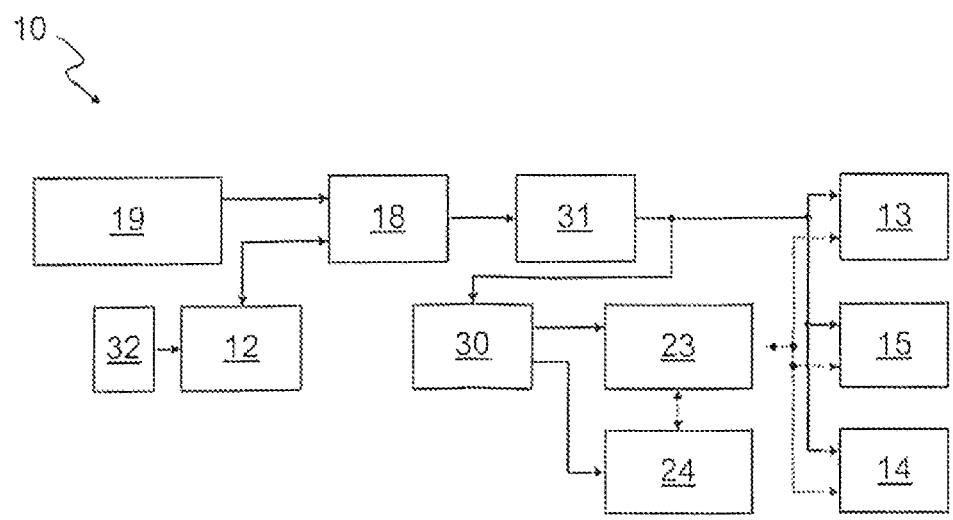

FIG. 4 schematically shows a block diagram of the electronic components of one of the movable door elements.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

FIG. 1 schematically shows a side view of an omnibus 1 having a plurality of automatic doors 2 which may be equipped with a door safety system 3 (cf. FIG. 2) according to the invention that is described in detail herein.

The invention is shown in FIGS. 1 and 2 purely by way of example for use with an omnibus 1. In principle, the invention is suitable for use with any door, but in particular for use with a door 2 of a transport means. An omnibus 1 or a rail vehicle may preferably be provided. However, the transport means may also be an aircraft, a cable car or an elevator car, for example.

The door 2 may have any design in principle and respectively has at least one movable door element 4, 4a, 4b and an immovable door frame 5. The door frame 5 is the framework of the door element 4, 4a, 4b. The door frame 5 may be fastened to a surrounding structure or may merge into a surrounding structure or may be formed in one part with a surrounding structure. A plurality of doors 2 may therefore also have a common door frame 5, for example. In the context of the invention, the door frame 5 may also be interpreted as a synonym for a component that is immovable relative to the door elements 4, 4a, 4b, in particular if the door frame 5 is not an independent, delimited assembly which can be uniquely assigned to the door 2. In the exemplary embodiment, the door frame 5 merges into the body 6 of the omnibus 1. If reference is therefore made herein to the fact that a particular electronic component or other component is arranged on the door frame 5, this component may fundamentally also be arranged at another immovable location in the omnibus 1 or on the body 6 of the omnibus 1; however, the electronic component or other component is preferably situated as close as possible to the movable door elements 4, 4a, 4b and particularly preferably on the door frame 5 proper.

The omnibus 1 illustrated by way of example in FIG. 1 has a front door 2, for which precisely one movable door element 4 is provided, and a middle door 2 and a rear door 2 which each have precisely two door elements 4a, 4b. The door elements 4, 4a, 4b are each in the form of door leaves.

FIG. 2 shows a detail enlargement of one of the double doors 2 of the omnibus 1 from FIG. 1. In this case, a first door element 4a in a closed state and a second door element 4b in an open state are shown purely by way of example. In order to automatically open or close the door elements 4a, 4b, an actuator device 7 is arranged on the immovable door frame 5.

In the exemplary embodiment shown in FIG. 2, the actuator device 7 respectively has an electric motor 8 with a respective pivot arm 9 for each door element 4a, 4b (illustrated using dashed lines in FIG. 2 since the electric motor 8 and the pivot arm 9 are situated on the inside of the omnibus 1). In principle, it is also possible to provide only a single electric motor 8 which synchronously opens or closes both door elements 4a, 4b. However, the flexibility when actuating the door 2 may be increased if a separate electric motor 8 is used for each of the door elements 4a, 4b. The mechanical structure when using two electric motors 8 can also be simplified.

The door safety system 3 illustrated has a safety component 10 on each of the movable door elements 4a, 4b of the door 2. The immovable door frame 5 of the door 2 also respectively has a corresponding supply component 11 (however, the supply component 11 assigned to the second door element 4b is concealed by the open door element 4b in FIG. 2).

The electronic components are illustrated using dashed lines in FIG. 2 and are generally accommodated in the door elements 4a, 4b or in the door frame 5. The electronic components may possibly be covered by additional housing components. The electronic components may also be electromagnetically shielded, but it should be ensured that the wireless energy and data transmission described below is not impaired thereby.

Each of the safety components 10 has an electrical energy store 12 which is designed to autonomously supply the safety component 10 with electrical energy in the open state of the door 2. In the closed state of the door 2, the corresponding supply component 11 can electrically charge the electrical energy store 12 of the assigned safety component 10. This makes it possible to dispense with cable harnesses between the stationary door frame 5 and the movable door elements 4, 4a, 4b for the purpose of supplying energy to their safety components 10.

The safety component 10 is preferably designed to protect living beings or objects. Various safety systems, in particular also in combination with one another, can be provided for this purpose. For example, the safety component 10 may have a light barrier or a light curtain 13 for detecting living beings or objects in the closing region of the door 2, a safety contact strip 14 for detecting a collision of the door element 4, 4a, 4b with a living being or an object and an optical, acoustic or haptic signal generator, for example the light strip 15 illustrated, for warning living beings.

The safety component 10 may be designed to transmit an electrical interruption signal 16 to the actuator device 7 used to move the door element 4, 4a, 4b or to the electric motors 8 of said actuator device or to initiate transmission of an interruption signal 16 in order to interrupt an automatic closing operation of the door 2. The principle of generating or triggering the interruption signal 16 is explained in yet more detail herein below.

The electrical energy store 12 of the safety component 10 may be, in particular, in the form of a rechargeable battery pack with at least one rechargeable battery cell. A lithium ion rechargeable battery pack with a plurality of rechargeable battery cells, for example four rechargeable battery cells in a series circuit, is preferably provided.

The safety component 10 and the supply component 11 are designed to electrically charge the electrical energy store 12 of the safety component 10 wirelessly, inductively in the exemplary embodiment using suitable coils 17, in the closed state of the door 2. In the closed state of the door 2, the coils 17 are positioned sufficiently close to one another and are aligned with one another in such a manner that electrical energy can be transmitted from the supply component 11 to the safety component 10. As soon as the door 2 is opened, the coils 17 move away from one another as a result of the opening movement of the door element 4, 4a, 4b until it is no longer possible to transmit energy. After this time in particular, however, the safety component 10 of the door element 4, 4a, 4b can supply itself with electrical energy by means of the energy store 12. The time windows in which the door 2 is not closed (for example is being opened or is completely open) and therefore also cannot be supplied with electricity by the door frame 5 can therefore be advantageously bridged.

In order to charge the electrical energy store 12, the safety component may have a suitable charging device or a battery management system (BMS) 18.

Energy can be supplied from the supply component 11 to the vehicle electrical system or a vehicle current source 21 (cf. FIG. 3), for example a vehicle battery, via an electrical supply line 20. This is relatively easily possible since the supply component 11 is arranged so as to be immovable relative to the body 6.

As an alternative to wirelessly transmitting energy between the supply component 11 and the safety component 10, contact-based energy transmission may also be provided in principle. For this purpose, the safety component 10 and the supply component 11 may be designed to electrically charge the electrical energy store 12 of the safety component 10 of the door 2 by virtue of a contact element (not illustrated) arranged on the door element 4, 4a, 4b and electrically connected to the safety component 10 making contact with a mating contact element (not illustrated) arranged on the door frame 5 and electrically connected to the supply component 11 in the closed state of the door 2. However, this variant of the invention is not preferred.

A control component 22 is optionally provided on the door frame 5 for the purpose of controlling and/or monitoring the safety component 10. The safety component 10 and the control component 22 are designed to wirelessly interchange electrical data signals with one another, for example signals from the light curtain 13 or from the safety contact strip 14. The control component 22 may therefore detect, for example, whether the door elements 4, 4a, 4b have collided with an object, after which the control component 22 can transmit the interruption signal 16 for stopping the movement of the door 2 to the actuator device 7 or to the electric motors 8.

Provision may also be made for the control component 22 to forward the data signals from the safety component 10 only to corresponding control units and to not evaluate said data signals itself. The control component 22 can then be used as a mediator in order to bridge the wireless signal path. Existing electronics can therefore be retrofitted in a comparatively simple manner. The principle is explained in more detail herein on the basis of FIG. 4.

However, the control component 22 may also directly forward an interruption signal 16 generated by the safety component 10. For this purpose, a control device 23 of the safety component 10 may itself already evaluate the information or data from the individual safety systems, that is to say from the light curtain 13 and the safety contact strip 14, for example.

In addition, the control component 22 can actuate the electronic components of the safety component 10, for example the light strip 15. Bidirectional communication can therefore also be provided.

The safety component 10 and the control component 22 are preferably designed to wirelessly interchange the data signals using a radio standard, in particular using a radio standard within the ISM band. The control component 22 preferably produces a WLAN radio network, into which individual radio modules 24 of the safety components 10 can dial for the purpose of transmitting data.

In order to illustrate the electrical connection of the door safety system 3, FIGS. 3 and 4 show, by way of example, block diagrams of the electronic components of the door frame 5 and of the supply component 11 and the control component 22 (FIG. 3) and of the movable door element 4, 4a, 4b and the safety component 10 (FIG. 4).

The individual electronic components are illustrated only by way of example in combination with one another in FIGS. 3 and 4. In particular, individual electronic components may also be dispensed with or combined with further electronic components. In particular, the voltage values described should also be understood merely as an example.

Data signals are illustrated using dashed lines in FIGS. 3 and 4 and supply signals are illustrated using solid lines.

The vehicle current source 21 which has already been mentioned and can provide a nominal electrical DC voltage of 24 volts, for example, can be used to supply electrical energy to the supply component 11 and the control component 22. The supply line 20 can lead to one or more supply components 11 which can transmit the electrical energy to the respective corresponding wireless energy receiver 19 (cf. FIG. 4) of the safety component 10 when the door 2 is closed (for example using the coils 17 illustrated in FIG. 2). Each door element 4a, 4b is therefore preferably supplied with electricity by a separate supply component 11 of the door frame 5. If only one door element 4 is provided, it is possible to dispense with the upper supply component 11 in FIG. 3, for example.

Individual control units of the door safety system may likewise be supplied by the vehicle current source 21 for the purpose of controlling and/or monitoring the respective safety systems of the safety components 10. For example, it is possible to provide a first control unit 25 for controlling and/or monitoring the light curtain 13, a second control unit 26 for controlling and/or monitoring the light strip 15 and a third control unit 27 for controlling and/or monitoring the safety contact strip 14.

The control component 22 may also be supplied by the vehicle current source 21. The control component 22 may have a control device 28 which is communicatively connected to the individual control units 25, 26, 27. The control device 28 may be wirelessly connected to the safety components 10 of the door elements 4, 4a, 4b via a radio module 29, in particular in order to forward the data from the light curtain 13 and from the safety contact strip 14, which are captured by the respective safety components 10, to the first control unit 25 and the third control unit 27 and in order to forward the control signals for actuating the light strip 15 from the second control unit 26 to the light strip 15 of the respective door element 4, 4a, 4b. The control component 22 is therefore used as a mediator between the wireless path. This makes it possible to advantageously dispense with a direct cable connection which is usually required between the safety systems of the safety component 10 and the individual control units 25, 26, 27.

Voltage converters, in particular DC/DC converters, can also be used to supply energy to the individual electronic components arranged in the door frame 5. By way of example, a buck converter 30 is illustrated for the purpose of supplying the control component 22 in FIG. 3 in order to provide, for example, a nominal supply voltage of 5 volts for the purpose of supplying the control component 22. The buck converter 30 may also be integrated in one of the supply components 11, for example.

As is clear from the block diagram in FIG. 4, the electronic components of the safety component 10 are fundamentally supplied with electricity via the electrical energy store 12 of the safety component 10, wherein the energy store 12 can be electrically charged by the electrical supply voltage of 19 to 20 volts, for example, received by the wireless energy receiver 19, using a charging device or a battery management system 18 (at least if the door 2 is closed).

The battery management system 18 can forward the voltage from the energy store 12, a rechargeable battery pack in the present case, to a DC/DC converter, for example a boost converter 31, which supplies the further electrical components with electricity, for example with a nominal DC voltage of 24 volts corresponding to the supply voltage of the vehicle current sources 21. A buck converter 30 may optionally also again be provided in order to supply further electronic components with a nominal voltage of 5 volts, for example.

A so-called balancer 32 may optionally be provided in order to provide a uniform charge distribution between a plurality of rechargeable battery cells of the rechargeable battery pack and possibly also an overcharging and deep-discharge protection system. The balancer 32 or the overcharging protection/deep-discharge protection system may also be part of the battery management system 18.

The safety component 10 may have the control device 23 which has already been mentioned and is connected to the radio module 24 in order to wirelessly communicate with the control device 28 of the door frame 5 via the radio module 29 of the control component 22. As a result, the data can be interchanged between the light curtain 13 and the first control unit 25, between the light strip 15 and the second control unit 26 and between the safety contact strip 14 and the third control unit 27.

The radio modules 24, 29 and the control units 23, 28 can therefore replace a conventional cable connection between the electronic components of the door frame 5 and the movable door elements 4, 4a, 4b.

Operation

Having described the structure of our Door Safety System, Method for Operating a Door Safety System, and Transport Means, its operation is briefly described.

A principal object of the present invention is a door safety system (3) for a door (2), having a movable door element (4, 4a, 4b) and an immovable door frame (5), comprising: a safety component (10) arranged on the movable door element (4, 4a, 4b) of the door (2), and the safety component (10) has an electrical energy store (12); and a supply component (11) which is arranged on the immovable door frame (5) of the door (2) and the supply component (11) supplies the safety component (10) with electricity; and wherein the electrical energy store (12) autonomously supplies the safety component (10) with electrical energy when the door (2) is in an open state relative to the immovable door frame (5); and wherein the safety component (10) and the supply component (11) electrically charge the electrical energy store (12) of the safety component (10) when the door (2) is in a closed state relative to the immovable door frame (5).

A further object of the present invention is a door safety system (3) and wherein the safety component (10) is designed to protect living beings or objects.

A further object of the present invention is a door safety system (3) and further comprising: a light barrier (13) for detecting living beings or objects in a closing region of the door (2).

A further object of the present invention is a door safety system (3) and further comprising: an actuator device (7) to move the movable door element (4, 4a, 4b) relative to the immovable door frame (5); and wherein the safety component (1) initiates transmission of an interruption signal (16) to the actuator device (7) in order to interrupt an automatic closing operation of the door (2) by the actuator device (7).

A further object of the present invention is a door safety system (3) and wherein the electrical energy store (12) of the safety component (10) is a rechargeable battery pack with at least one rechargeable battery cell.

A further object of the present invention is a door safety system (3) and wherein the safety component (10) and the supply component (11) are designed to electrically charge the electrical energy store (12) of the safety component (10) wirelessly, in the closed state of the door (2).

A further object of the present invention is a door safety system (3) and further comprising: a contact element arranged on the movable door element (4, 4a, 4b) and electrically connected to the safety component (10); and a mating contact element arranged on the immovable door frame (5) and the mating contact element is electrically connected to the supply component (11) and contacts the contact element on the movable door element (4, 4a, 4b) when the door (2) is in the closed state; and the safety component (10) and the supply component (11) electrically charge the electrical energy store (12) of the safety component (10) of the door (2).

A further object of the present invention is a door safety system (3) and further comprising: a control component (22) for controlling and/or monitoring the safety component (10), and the control component (22) is arranged on the immovable door frame (5); and wherein the safety component (10) and the control component (22) are designed to communicate bidirectionally and wirelessly with one another.

A further object of the present invention is a door safety system (3) and wherein the safety component (10) and the control component (22) wirelessly interchange electrical data signals with one another.

A further object of the present invention is a door safety system (3) and wherein the safety component (10) and the control component (22) wirelessly interchange the electrical data signals using a radio standard.

A further object of the present invention is a door (2), in particular an automatic door (2) of a transport means (1) comprising: an immovable door frame (5) carried by the transport means (1); a movable door element (4, 4a, 4b) at least partially movably carried by the immovable door frame (5); and a door safety system (3) having, a safety component (10) arranged on the movable door element (4, 4a, 4b) of the door (2), and the safety component (10) has an electrical energy store (12), and a supply component (11) which is arranged on the immovable door frame (5) of the door (2) and the supply component supplies the safety component (10) with electricity, and wherein the electrical energy store (12) autonomously supplies the safety component (10) with electrical energy when the door (2) is in an open state relative to the immovable door frame (5), and wherein the safety component (10) and the supply component (11) electrically charge the electrical energy store (12) of the safety component (10) when the door (2) is in a closed state relative to the immovable door frame (5).

A further object of the present invention is a door (2) and wherein the transport means is an omnibus (1), a rail vehicle, an aircraft, a cable car or an elevator car.

A further object of the present invention is a door (2) wherein the movable door element (4, 4a, 4b) is in the form of a door leaf.

A further object of the present invention is a door (2) as claimed in claim 11 and wherein precisely two movable door elements (4, 4a, 4b) are provided; and wherein each of the precisely two movable door elements (4, 4a, 4b) has a corresponding safety component (10) which is supplied with electricity by the supply component (11) of the immovable door frame (5).

A further object of the present invention is a door (2) and further comprising: an actuator device (Z) arranged on the immovable door frame (5) to automatically open and close the movable door element (4, 4a, 4b).

A further object of the present invention is a transport means (1), in particular an omnibus (1) or a rail vehicle comprising: at least one door (2), in particular an automatic door (2) of the transport means (1); an immovable door frame (5) carried by the transport means (1); a movable door element (4, 4a, 4b) at least partially movably carried by the immovable door frame (5); and a door safety system (3) having a safety component (10) arranged on the movable door element (4, 4a, 4b) of the door (2), and the safety component (10) has an electrical energy store (12), and a supply component (11) which is arranged on the immovable door frame (5) of the door (2) and the supply component supplies the safety component (10) with electricity, and wherein the electrical energy store (12) autonomously supplies the safety component (10) with electrical energy when the door (2) is in an open state relative to the immovable door frame (5), and wherein the safety component (10) and the supply component (11) electrically charge the electrical energy store (12) of the safety component (10) when the door (2) is in a closed state relative to the immovable door frame (5).

A further object of the present invention is a method for operating a door safety system (3) of a door (2), the method comprising the steps: providing an immovable door frame (5) of the door (2); providing a movable door element (4, 4a, 4b) that is at least partially movable relative to the immovable door frame (5); providing a safety component (10) arranged on the movable door element (4, 4a, 4b); providing a supply component (11) arranged on the immovable door frame (5) of the door (2) to supply electricity to the safety component (10); providing an electrical store (12) that autonomously supplies electrical energy to the safety component (10) when the door (2) is in an open state; and electrically charging the electrical store (12) by means of the supply component (11) when the door (2) is in a closed state.

A further object of the present invention is a door safety system (3) and further comprising: a safety contact strip (14) for detecting a collision of the movable door element (4, 4a, 4b) with a living being or an object.

A further object of the present invention is a door safety system (3) and further comprising: an optical, acoustic or haptic signal generator (15) for warning living beings.

A still further object of the present invention is a door safety system (3) and wherein the safety component (10) and the supply component (11) are designed to electrically charge the electrical energy store (12) of the safety component (10) inductively, when the door (2) is in a closed state.

An even still further object of the present invention is a door safety system (3) as claimed in claim 9 and wherein the safety component (10) and the control component (22) wirelessly interchange the electrical data signals using a radio standard within an ISM band.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A door safety system (3) for a door (2), having a movable door element (4, 4a, 4b) and an immovable door frame (5), comprising:
   a safety component (10) arranged on the movable door element (4, 4a, 4b) of the door (2), and the safety component (10) has an electrical energy store (12); and
   a supply component (11) which is arranged on the immovable door frame (5) of the door (2) and the supply component (11) supplies the safety component (10) with electricity; and wherein
   the electrical energy store (12) autonomously supplies the safety component (10) with electrical energy when the door (2) is in an open state relative to the immovable door frame (5); and wherein
   the safety component (10) and the supply component (11) electrically charge the electrical energy store (12) of the safety component (10) when the door (2) is in a closed state relative to the immovable door frame (5); and wherein
   the safety component comprises at least one of a light barrier, a light curtain, a light grid a contact safety strip, an optical signal generator, an acoustic signal generator, or a haptic signal generator; and
a controller (22) for controlling and or monitoring the safety component (10); and
the controller (22) is arranged on the immovable door frame (5); and wherein
the safety component (10) and the controller (22) operatively communicate bidirectionally and wirelessly with one another; and wherein
the movable door element (4, 4a, 4b) is a door leaf.

2. The door safety system (3) as claimed in claim 1 and wherein the electrical energy store (12) of the safety component (10) is a rechargeable battery pack with at least one rechargeable battery cell.

3. The door safety system (3) as claimed in claim 1 and wherein the safety component (10) and the supply component (11) are designed to electrically charge the electrical energy store (12) of the safety component (10) wirelessly, in the closed state of the door (2).

4. The door safety system (3) as claimed in claim 1 and further comprising:
a contact element arranged on the movable door element (4, 4a, 4b) and electrically connected to the safety component (10); and
a mating contact element arranged on the immovable door frame (5) and the mating contact element is electrically connected to the supply component (11) and contacts the contact element on the movable door element (4, 4a, 4b) when the door (2) is in the closed state; and
the safety component (10) and the supply component (11) electrically charge the electrical energy store (12) of the safety component (10) of the door (2).

5. The door safety system (3) as claimed in claim 1 and wherein the safety component (10) and the controller (22) wirelessly interchange electrical data signals with one another.

6. The door safety system (3) as claimed in claim 5 and wherein the safety component (10) and the controller (22) wirelessly interchange the electrical data signals using a radio standard.

7. A door (2), in particular an automatic door (2) of a transport means (1) comprising:
an immovable door frame (5) carried by the transport means (1);
a movable door element (4, 4a, 4b) which comprises a door leaf, and the movable door element (4, 4a, 4b) is at least partially movably carried by the immovable door frame (5); and
a door safety system (3) having,
a safety component (10) arranged on the movable door element (4, 4a, 4b) of the door (2), and the safety component (10) has an electrical energy store (12), and wherein
the safety component comprises at least one of a light barrier, a light curtain, a light grid, a contact safety strip, an optical signal generator, an acoustic signal generator, or a haptic signal generator; and
a supply component (11) which is arranged on the immovable door frame (5) of the door (2) and the supply component supplies the safety component (10) with electricity, and wherein
the electrical energy store (12) autonomously supplies the safety component (10) with electrical energy when the door (2) is in an open state relative to the immovable door frame (5), and wherein
the safety component (10) and the supply component (11) electrically charge the electrical energy store (12) of the safety component (10) when the door (2) is in a closed state relative to the immovable door frame (5); and
a controller (22) for controlling and/or monitoring the safety component (10); and
the controller (22) is arranged on the immovable door frame (5); and wherein
the safety component (10) and the controller (22) operatively communicate bidirectionally and wirelessly with one another.

8. The door (2) as claimed in claim 7 and wherein the transport means is an omnibus (1), a rail vehicle, an aircraft, a cable car or an elevator car.

9. The door (2) as claimed in claim 7 and wherein the movable door element (4, 4a, 4b) is in the form of a door leaf.

10. The door (2) as claimed in claim 7 and wherein precisely two movable door elements (4, 4a, 4b) are provided; and wherein
each of the precisely two movable door elements (4, 4a, 4b) has a corresponding safety component (10) which is supplied with electricity by the supply component (11) of the immovable door frame (5).

11. The door (2) as claimed in claim 7 and further comprising:
an actuator device (7) comprising a motor (8) arranged on the immovable door frame (5) to automatically open and close the movable door element (4, 4a, 4b).

12. A transport means (1), in particular an omnibus (1) or a rail vehicle comprising:
at least one door (2), in particular an automatic door (2) of the transport means (1);
an immovable door frame (5) carried by the transport means (1);
a movable door element (4, 4a, 4b) which comprises a door leaf, and the movable door element (4, 4a, 4b) is at least partially movably carried by the immovable door frame (5); and
a door safety system (3) having,
a safety component (10) arranged on the movable door element (4, 4a, 4b) of the door (2), and the safety component (10) has an electrical energy store (12), and wherein
the safety component comprises at least one of a light barrier, a light curtain a light grid, a contact safety strip, an optical signal generator, an acoustic signal generator, a haptic signal generator; and
a supply component (11) which is arranged on the immovable door frame (5) of the door (2) and the supply component supplies the safety component (10) with electricity, and wherein
the electrical energy store (12) autonomously supplies the safety component (10) with electrical energy when the door (2) is in an open state relative to the immovable door frame (5), and wherein
the safety component (10) and the supply component (11) electrically charge the electrical energy store (12) of the safety component (10) when the door (2) is in a closed state relative to the immovable door frame (5); and
a controller (22) for controlling and/or monitoring the safety component (10); and
the controller (22) is arranged on the immovable door frame (5); and wherein
the safety component (10) and the controller (22) operatively communicate bidirectionally and wirelessly with one another.

13. A method for operating a door safety system (3) of a door (2), the method comprising the steps:
   providing an immovable door frame (5) of the door (2);
   providing a movable door element (4, 4a, 4b) comprising a door leaf that is at least partially movable relative to the immovable door frame (5);
   providing a safety component (10) arranged on the movable door element (4, 4a, 4b);
   providing a supply component (11) arranged on the immovable door frame (5) of the door (2) to supply electricity to the safety component (10); and wherein
   the safety component comprises at least one of a light barrier, a light curtain, a light grid, a contact safety strip, an optical signal generator, an acoustic signal generator, or a haptic signal generator; and
   providing an electrical store (12) that autonomously supplies electrical energy to the safety component (10) when the door (2) is in an open state; and
   electrically charging the electrical store (12) by means of the supply component (11) when the door (2) is in a closed state; and
   providing a controller (22) for controlling and/or monitoring the safety component (10), and wherein the controller (22) is arranged on the immovable door frame (5), and wherein the safety component (10) and the controller (22) operatively communicate bidirectionally and wirelessly with one another.

14. The door safety system (3) as claimed in claim 1 and further comprising:
   an optical, acoustic or haptic signal generator (15) for warning living beings.

15. The door safety system (3) as claimed in claim 1 and wherein the safety component (10) and the supply component (11) are designed to electrically charge the electrical energy store (12) of the safety component (10) inductively, when the door (2) is in a closed state.

16. The door safety system (3) as claimed in claim 5 and wherein the safety component (10) and the controller (22) wirelessly interchange the electrical data signals using a radio standard within an ISM band.

17. The door safety system (3) as claimed in claim 1 and wherein the supply component (11) comprises a coil for wireless energy transfer to the safety component, or contact elements for direct energy transfer to the safety component.

18. The door safety system (3) as claimed in claim 1 and wherein the light barrier (13) comprises a light grid for contactless anti-trap protection.

19. The door safety system (3) as claimed in claim 4 and wherein the contact element comprises a pair of contacting or contactless energy transmission contacts; and wherein
   one of the pair of contacting, or contactless, energy transmission contacts is on the movable door element (4), (4A), 4(B) and another one of the pair of contacting, or contactless, energy transmission contacts is on the immovable door frame (5) so as to transmit energy therebetween.

20. The door safety system (3) as claimed in claim 1 and wherein the contact safety strip (14) comprises a sensor for detecting physical contact of the movable door element (4), (4A), (4B) with a living being or with an object.

21. The door safety system (3) as claimed in claim 1 and wherein the optical, acoustic, or haptic signal generator comprises a device which generates an audible warning, or a visual warning, or a tactile sensation upon receipt of a signal from the controller to provide a warning to a living being.

* * * * *